(12) United States Patent
Saunders et al.

(10) Patent No.: US 7,242,862 B2
(45) Date of Patent: Jul. 10, 2007

(54) NETWORK DIAGNOSTIC TOOL FOR AN OPTICAL TRANSPORT NETWORK

(75) Inventors: Ross Saunders, Ottawa (CA); Avid Lemus, Kanata (CA); John Somerton, Kanata (CA); Ashish Duggal, Kanata (CA)

(73) Assignee: Altera Corporation, San Jose, CA (US)

( * ) Notice: Subject to any disclaimer, the term of this patent is extended or adjusted under 35 U.S.C. 154(b) by 838 days.

(21) Appl. No.: 10/054,009

(22) Filed: Jan. 21, 2002

(65) Prior Publication Data

US 2004/0208501 A1 Oct. 21, 2004

(51) Int. Cl.
*H04B 10/00* (2006.01)
(52) U.S. Cl. .............................. 398/30; 398/16; 398/25
(58) Field of Classification Search ............... 398/9–38
See application file for complete search history.

(56) References Cited

U.S. PATENT DOCUMENTS 5,570,217 A 10/1996 Fleuren
5,710,648 A 1/1998 Frigo
5,914,794 A 6/1999 Fee et al.
5,926,263 A 7/1999 Lynch et al.
5,978,115 A 11/1999 Condict et al.
6,075,628 A 6/2000 Fisher et al.
6,433,903 B1 * 8/2002 Barry et al. .................. 398/79
6,504,646 B1 * 1/2003 Amoruso ................. 359/341.1
6,687,464 B1 * 2/2004 Roberts et al. ............. 398/158
6,778,778 B1 * 8/2004 Richards et al. ............. 398/14
2001/0038475 A1 11/2001 Wolf \* cited by examiner

*Primary Examiner*—Augustin Bello
(74) *Attorney, Agent, or Firm*—Harness, Dickey & Pierce, P.L.C.

(57) ABSTRACT

A network diagnostic system is provided for an optical transport network having a plurality of network elements. The network diagnostic system includes at least one network element having a network diagnostic operation integrated therein and operable to perform the network diagnostic operation, thereby determining a network performance characteristic associated with the optical transport network; a wayside communication subsystem interconnecting the network elements residing in the optical transport network; and a network diagnostic device in data communication with the at least one network element and operable to initiate the network diagnostic operation at the network element.

31 Claims, 10 Drawing Sheets

```
                    OTDR TEST DATA
┌─────────────────┬──────────────────────┬─────────────────┐
│   HEADER INFO   │   OPTICAL TRACE INFO │   FIBER INFO    │
└─────────────────┴──────────────────────┴─────────────────┘
    ├ TEST TYPE         ├ MEASURE DISTANCE    └ REFRACTIVE INDEX
    ├ TEST ID           ├ OPTICAL POWER
    ├ DATE              └ TRACE EVENTS
    ├ TIME                    ├ EVENT ID
    ├ TRACE ID                ├ EVENT TYPE
    ├ COMMENT                 ├ EVENT DISTANCE
    └ FILE CHECKSUM           ├ REFLECTANCE
                              ├ INSERTION LOSS
                              ├ CUMULATIVE LOSS
                              ├ ATTENUATION
                              └ DESCRIPTION
```

*Fig-3*

```
                    OSA TEST DATA
┌─────────────────┬──────────────────────┬─────────────────────┐
│   HEADER INFO   │   SIGNAL TRACE INFO  │  CHANNEL TRACE INFO │
└─────────────────┴──────────────────────┴─────────────────────┘
    ├ TEST TYPE         ├ MEASURED            ├ CHANNEL NO.
    ├ TEST ID           │  WAVELENGTH         ├ MEASURED
    ├ DATE              └ OPTICAL POWER       │  WAVELENGTH
    ├ TIME                                    ├ WAVELENGTH
    ├ TRACE ID                                │  VARIANCE
    ├ COMMENT                                 ├ OSNR
    └ FILE CHECKSUM                           └ COMMENT
```

NETWORK DIAGNOSTIC TOOL FOR AN OPTICAL TRANSPORT NETWORK

FIELD OF THE INVENTION

The present invention relates generally to optical network management and, more particularly, to a network diagnostic tool for an optical transport network.

BACKGROUND OF THE INVENTION

The rapid development of technology in combination with the exponential growth of data traffic creates requirements for increased optical networking service velocity and decreased time-to-revenue. This has a profound impact on the way in which telecommunications carriers need to build out their networks—service deployment within an optical network needs to happen at an increasingly faster pace while at the same time decreasing associated costs. This also applies in the event of a service degradation or disruption in which diagnostics of the service must be performed.

Deployment of a conventional optical transport network involves installation, testing, and turn-up of optical paths. Traditionally, this would require a "truck-roll" of highly skilled technicians along with expensive test equipment to each site in the network that is involved in carrying the optical circuit(s). In addition, provisioning circuits across multiple SONET rings in the traditional SONET network architecture is currently time consuming and again, involves the physical presence of a technician and test equipment at each intermediate point in the circuit. The same holds true when the need arises to perform diagnostics on a circuit that has degraded or been disrupted. Currently, the shortage of qualified technicians coupled with the need for expensive test equipment and time consuming truck-rolls creates serious concerns regarding the feasibility, scalability, and time-to-market of building out large scale optical networks.

However, the latest developments in intelligent optical networks promise the cost benefit of mesh restoration and the ease of point and click bandwidth provisioning. These developments will go a long way towards alleviating the time consuming task of provisioning circuits across multiple SONET rings. They do not however address the more fundamental issues of deploying and maintaining the network.

Therefore, it is desirable to provide an integrated network diagnostic tool set that is used in the installation and maintenance of optical transport networks. The diagnostic tool set is characterized by the use of on-board optical and electronic test equipment that is directly integrated into each network element residing in the optical network. Additionally, the tool set includes a software-implemented interface that enables technicians to trigger diagnostic tests at the network elements and then display, analyze and manipulate the test results at a remote network operation site.

SUMMARY OF THE INVENTION

In accordance with the present invention, a network diagnostic system is provided for an optical transport network having a plurality of network elements. The network diagnostic system includes at least one network element having a network diagnostic operation integrated therein and operable to perform the network diagnostic operation, thereby determining a network performance characteristic associated with the optical transport network; a wayside communication subsystem interconnecting the network elements residing in the optical transport network; and a network diagnostic device in data communication with at least one network element and operable to initiate the network diagnostic operation at the network element.

For a more complete understanding of the invention, its objects and advantages, reference may be had to the following specification and to the accompanying drawings.

BRIEF DESCRIPTION OF THE DRAWINGS

FIG. 3 is an exemplary data structure for OTDR test data in accordance with the present invention;

FIG. 5 is an exemplary data structure for OSA test data in accordance with the present invention;

DETAILED DESCRIPTION OF THE PREFERRED EMBODIMENTS

Figure 1:
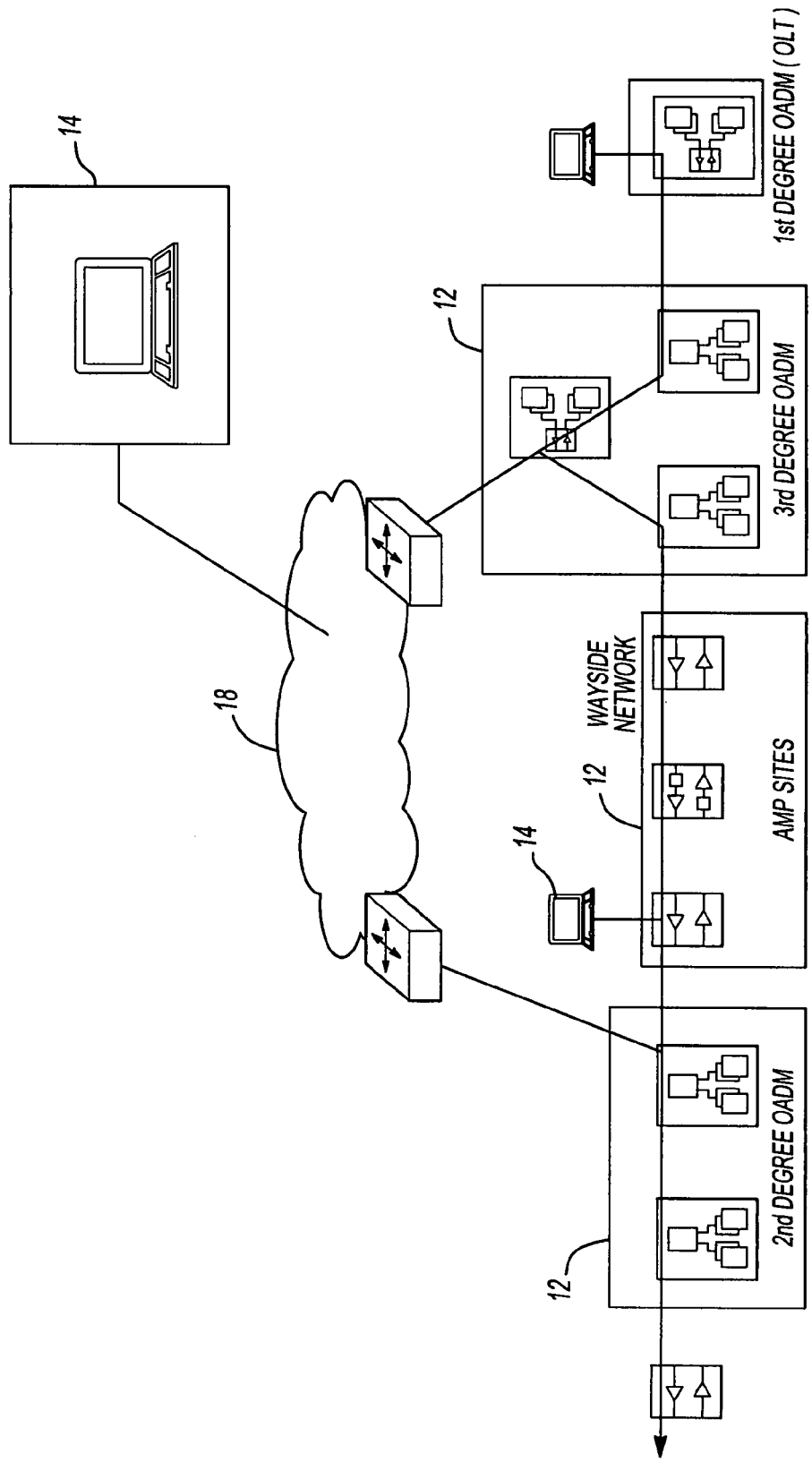
FIG. 1 is a diagram of an integrated network diagnostic system for an optical transport network in accordance with the present invention.

FIG. 1 illustrates an integrated network diagnostic system 10 for an optical transport network having a plurality of network elements 12. Each network element 12 includes on-board diagnostic test equipment that is integrated therein as further described below. The diagnostic test equipment is operable to perform a network diagnostic operation that determines at least one network performance characteristic associated with the optical transport network. More specifically, the network diagnostic operation directly monitors and/or measures an optical signal traversing the optical transport network. For example, the diagnostic test equipment may be capable of performing bit rate error testing, optical spectral analysis, optical time domain reflectometry, optical power measurements, eye contour mapping measurements and other network diagnostic operations.

A network diagnostic device 14 is preferably in data communication via a wayside communication subsystem 16 with each of the network elements 12 residing in the optical transport network. In a preferred embodiment, the network diagnostic device 14 may be directly connected via an Ethernet port to one or more of the network elements 12. Data requests to and from the network diagnostic device 14 are in the form of Ethernet frames as is well known in the art. The network elements 12 are in turn interconnected via an optical supervisory channel that is integrated into the optical transport network. The Ethernet frames are mapped into a payload portion of one or more optical network frames which may be transmitted via the optical supervisory channel across the network. In this way, data requests can be transmitted amongst the network elements. Further implementation details of such a wayside communication system are disclosed in U.S. application Ser. No. 09/968,951 filed on Oct. 1, 2001 which is assigned to the assignee of the present invention and incorporated herein by reference.

Alternatively, the network diagnostic device 14 may be remotely located from the optical transport network. In this case, the network diagnostic device 14 is interconnected via a packet-based computer network 18, such as the Internet, to one or more of the network elements 12. In this way, data requests in the form of Ethernet frames are easily communicated from the network diagnostic device 14 to a network element 12. However, it is envisioned that other types of wayside communication subsystems may also be used to interconnect the network diagnostic device 14 to each of the network elements. For instance, a disjoint overlay data network may be suitably used to provide wayside communication for an optical transport network.

In operation, the network diagnostic device 14 is operable to initiate a network diagnostic operation on one or more of the network elements 12 residing in the optical transport network. The network diagnostic operation is initiated via a request sent over the wayside communication subsystem 16 to the applicable network elements 12. The network diagnostic operation is perform by the network element, thereby determining at least one network performance characteristic associated with the optical transport network. The network performance information is then transmitted from the network element 12 back to the network diagnostic device 14.

Each network element 12 includes diagnostic test equipment to perform one or more of the following network diagnostic operations or measurements: an integrated optical time domain reflectometer (OTDR), an integrated optical spectrum analyzer (OSA), an integrated optical power monitor, an integrated bit rate error measurement tool (BERTS), an integrated Q measurement tool, and an integrated Q contour mapping tool. Each of these diagnostic operations are further described below. However, it is envisioned that other types of network diagnostic operations or performance measurement tools are also within the broader aspects of the present invention.

Connectorization is one of the most common problems associated with optical transport networks. Each optical path travels through multiple fiber distribution panels (FDPs) between transmitter and receiver, and each connection through an FDP represents a risk to the optical performance. Dirty, damaged, or loose connectors cause power loss and reflections, which, in turn, cause optical signal-to-noise ratio (OSNR) degradation and interference as well as induce bit errors. The only way to ensure the quality of the optical path is to perform OTDR testing on that path.

Figure 2:
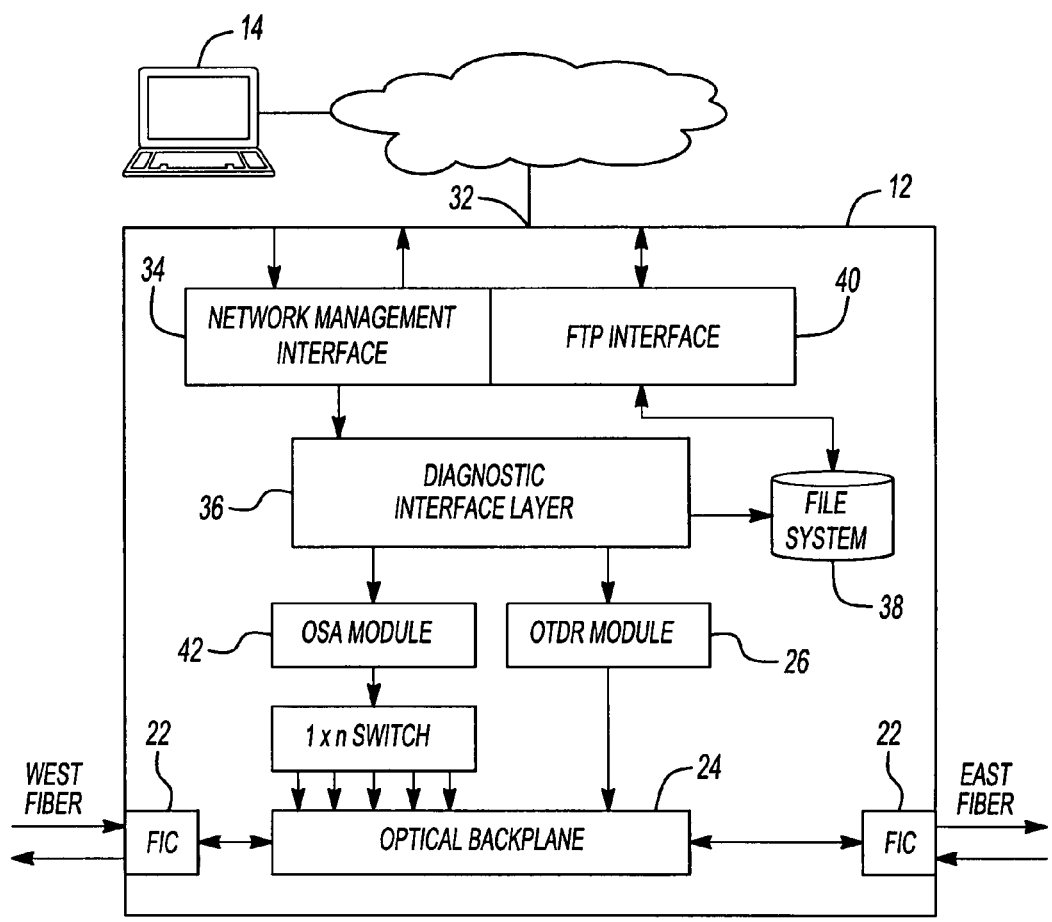
FIG. 2 is a block diagram illustrating how OTDR testing and OSA testing are integrated into a network element in accordance with the present invention.

The integrated network diagnostic system 10 of the present invention integrates OTDR testing into a network element as shown in FIG. 2. OTDR testing is preferably integrated into an optical common shelf of a network element. An optical common shelf is an inherently optical shelf. The optical common shelf includes two or more fiber interface cards 22 interconnected by an optical backplane 24 as is well known in the art. It is also envisioned that OTDR testing may be integrated into optical amplifier shelves and/or optical channel interface shelves.

To initiate an OTDR test, a request for the diagnostic operation is made by a network diagnostic device 14. A network management interface 34 residing on the shelf receives the request via a wayside Ethernet port 32. The request may be transmitted across an intervening computer network using TL1, SNMP or other well known network management protocols. The network management interface 34 in turn issues the request to a diagnostic interface layer 36. The diagnostic interface layer 36 is a software-implemented application that controls the diagnostic functions performed on the shelf. In this instance, the diagnostic interface layer 36 interacts with the an OTDR module 26 that is also integrated in the shelf. In particular, the OTDR module 24 resides on a communication card that ties into the optical backplane 24. The OTDR module 26 is operable to perform traces on the optical fibers connected to the shelf. Further implementation details for integrating an OTDR module into a network element are disclosed in U.S. Ser. No. 09/943,077 filed on Aug. 30, 2001 which is assigned to the assignee of the present invention and incorporated herein by reference.

It should be noted that the traces are preferably performed over an optical supervisory channel that provides connectivity between each of the network elements in the optical transport network. Bi-directionality of the optical supervisory channel enable carriers to perform bi-directional OTDR span testing, as well as conduct such testing from either end of the span. OTDR test data collected by the OTDR module 26 is then passed back to the diagnostic interface layer 36.

Due to the static and fairly data intensive nature of OTDR testing, the diagnostic interface layer 36 stores OTDR test data in a memory space on the shelf, and then employs a file transfer scheme to transmit the OTDR test data back to the network diagnostic device 14. Specifically, OTDR test data is formatted into a test data file that is stored on a local data storage device 38. To transfer the test data file, the network diagnostic device 14 requests the filename and corresponding file address information for a particular data file. The request may be made at some predetermined time period after requesting a diagnostic operation and/or at periodic time intervals. In response to the request, the diagnostic interface layer 36 returns a fully qualified filename and file address for the requested test data file. Alternatively, the file name and address may be returned to the network diagnostic device in response to the initial test request.

Next, the network diagnostic device 14 initiates a file transfer request to the network element using the filename and the corresponding file address information. The file transfer request is received by a file transfer interface 40 residing on the shelf. The file transfer interface 40 is a software-implemented application that facilitates the transfer of data files to and from the network element. In response to the request, the file transfer interface 40 retrieves the requested data file from the data storage device 38, and then transfers the data file to the network diagnostic device 14. It is readily understood that the file transfer is enabled through the use of FTP or other well known file transfer protocols.

OTDR test data is preferably stored in accordance with the data structure described below. Each OTDR test data file is partitioned into file header information, optical trace information, and span/fiber characteristic information. File header information identifies the test data contained in the data file. For instance, the file header information may include a diagnostic test type, a unique test identifier, a unique trace identifier, a timestamp at which the test was performed, and error detection data, such as a checksum value. Optical trace information primarily provides optical attenuation data for an optical trace signal at different measurement points along the optical span. The optical attenuation data is preferably expressed in terms of reflected optical power at incremental measurement distances from the trace signal source. As will be further described below, the optical attenuation data may be used to visually plot the optical trace. Lastly, OTDR test data includes refractive index data for each fiber span implicated in the optical trace.

Additional information may also be captured for certain trace events that are detected during the trace. Each detected trace event is preferably expressed in terms of the following data fields: a unique event identifier, an event type, the distance of the event from the trace signal source, the reflectance of the event (expressed as the ratio of the reflected power to incident power at a reflection point), the insertion loss of the event, the cumulative loss for the event (expressed as the insertion loss and attenuation loss up to the point of the current event), the attenuation between the event and a subsequently identified event and a description of the event. The additional trace event data is used to further assess performance at different points along the measured span. An exemplary data structure for OTDR test data files is shown in FIG. 3.

Figure 4:
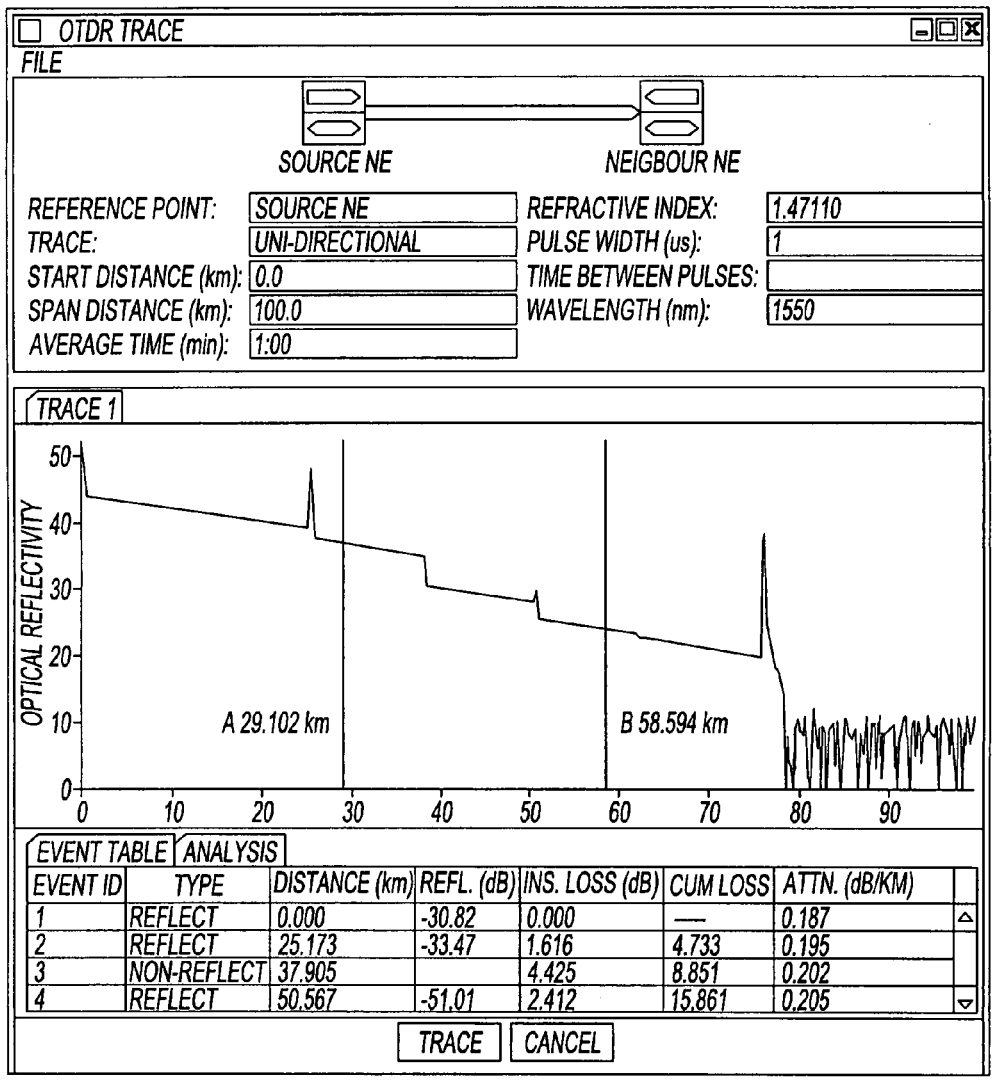
FIG. 4 is an exemplary graphical user interface employed by the network diagnostic device to display OTDR test data in accordance with the present invention.

The network diagnostic device 14 is operable to parse the OTDR test data file and display the test results using an intuitive graphical user interface. The network diagnostic device 14 may also allow a network operator or technician to manipulate the OTDR test data. An exemplary user interface for displaying and analyzing OTDR test data is illustrated in FIG. 4.

OTDR traces can pinpoint lossy or reflective connections and cable cuts to a particular resolution length (e.g. 12 cm), with no near-end or far-end dead bands. Carriers can characterize all connectors, from the optical backpanel through the metro FDPs to the backbone fiber span, before wavelength turn-up. The ability to complete a quality audit of the optical transport system before installing transponder cards saves time in fault isolation.

Because the OTDR is integrated into the optical supervisory channel, measurements are done after a network element is connected to the backbone fiber—as opposed to an external OTDR measurement equipment where the equipment is removed after the OTDR measurement, and the actual transmission equipment is then attached (possibly introducing a dirty connection). As an additional aid in system turn-up, the network diagnostic device 14 can display a previous OTDR trace and compare it to the current trace, enabling the operator to verify that the fiber characteristics have not changed since previous measurements were taken.

Should a cable cut occur, or if a fiber needs re-connection on an active system, OTDR traces can remotely identify the location of a fault and check the quality of the repair. This integrated OTDR function automatically sends an alarm message and trouble ticket detailing the location and type of fault to the network diagnostic device. Such detailed fault reporting eliminates the need to send trained technicians with expensive OTDR measurement equipment out to multiple field locations in an attempt to pinpoint the fault.

An optical spectrum analyzer (OSA) is also a valuable measurement tool for deploying optical transport systems. This test device characterizes the optical power, optical signal to noise ratio (OSNR), and wavelength accuracy of a composite dense wavelength division multiplex (DWDM) signal. The network diagnostic system 10 also integrates an OSA module 42 into the optical common shelf of a network element. Again, it is envisioned that OTDR testing may be integrated into optical amplifier shelves and optical channel interface shelves.

Referring to FIG. 2, an optical switch 44 may be interposed between the OSA module 42 and the optical backplane 24 of the shelf. For instance, the output port of a 1×8 optical switch may be fed as input into the OSA module 42 and the eight input ports of the switch are attached to different points of the optical backplane. Since the OSA testing connects all monitor taps through the optical backplane, no external optical patchcords are required to OSA testing. Controlling the switch effectively allows monitoring of up to seven points within the shelf, plus one external point, with a single OSA module 42. This switching architecture reduces the cost of OSA performance monitoring by reducing the number of required OSA modules.

Figure 6:
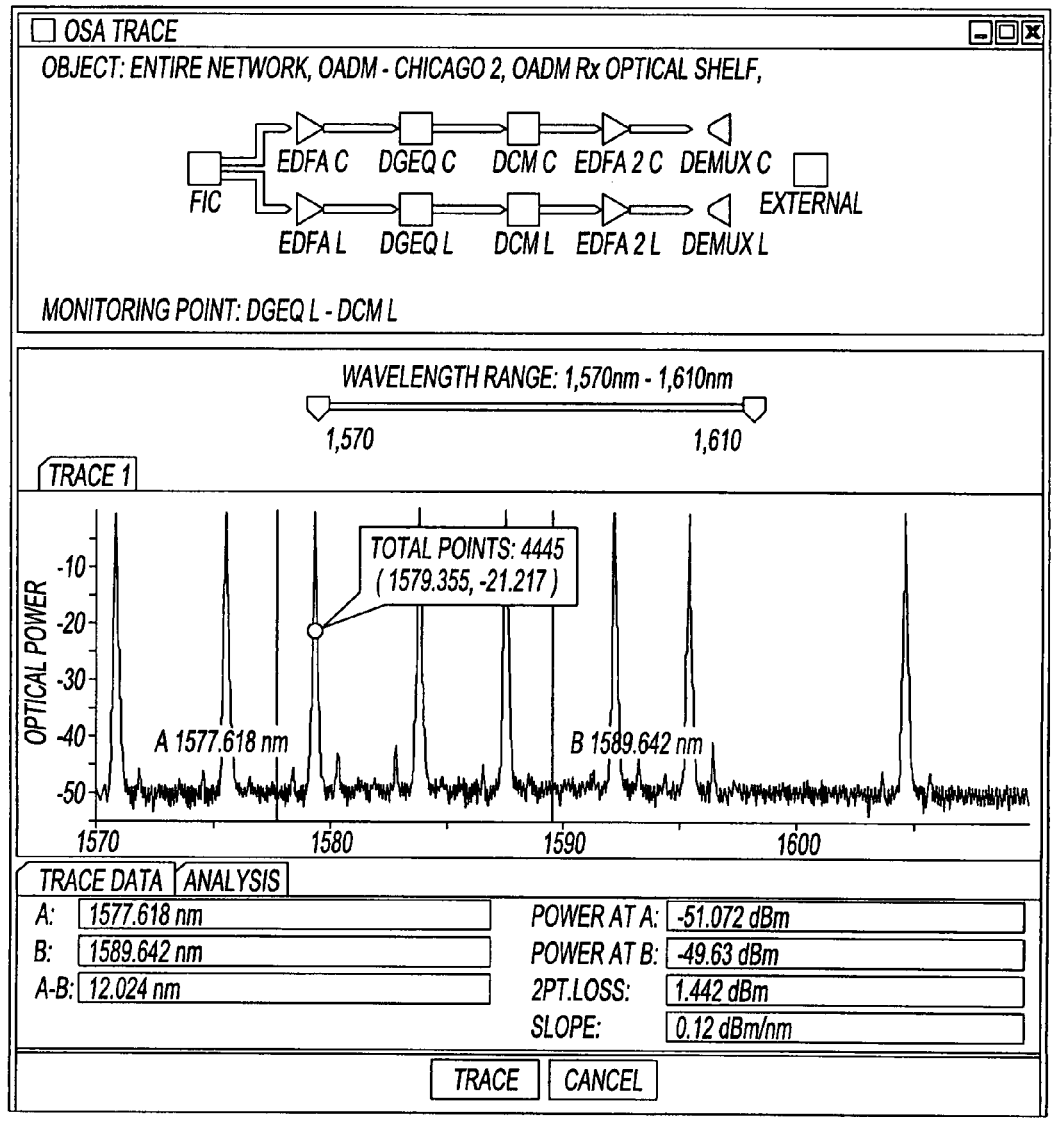
FIG. 6 is an exemplary graphical user interface employed by the network diagnostic device to display OSA test data in accordance with the present invention.
Figure 7:
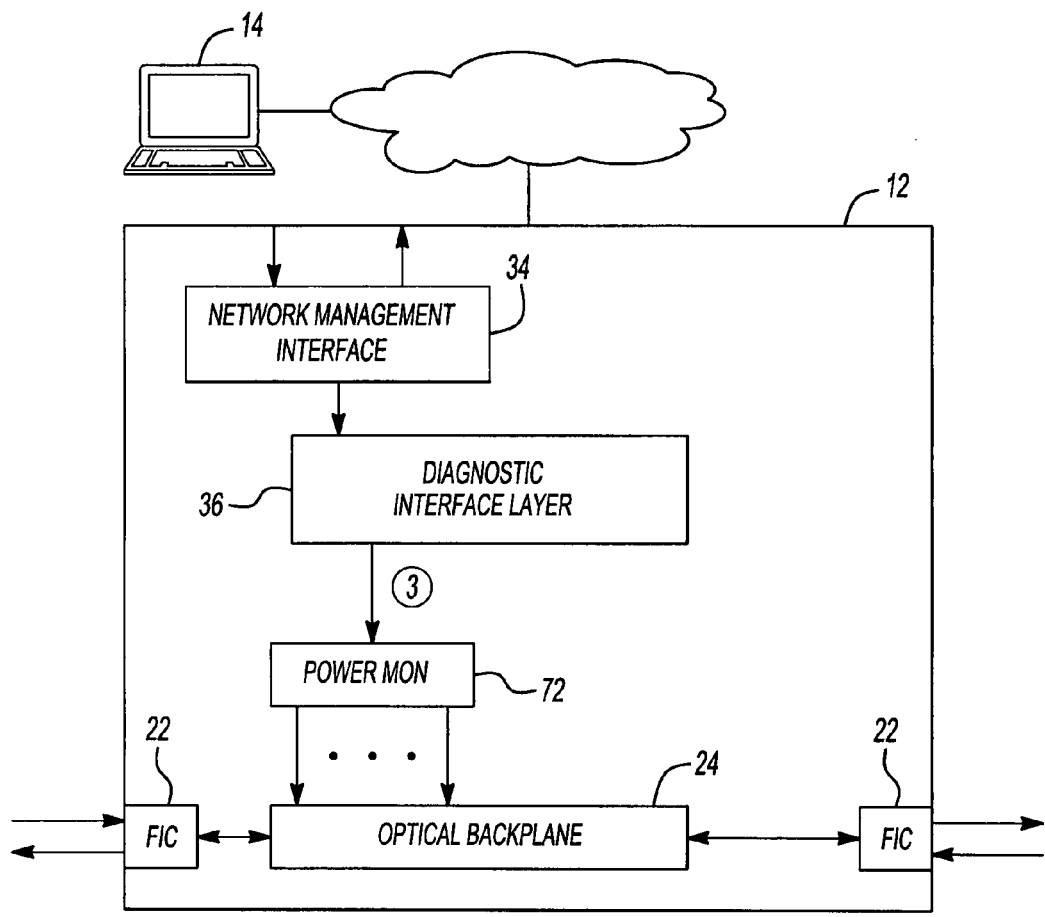
FIG. 7 is a block diagram illustrating how power monitoring is integrated into a network element in accordance with the present invention.

OSA testing is generally carried out in the same manner as OTDR testing. In other words, OSA test data is stored on a local storage device and then transferred to the network diagnostic device using a file transfer scheme as described above. OSA test data is preferably stored in accordance with the data structure shown in FIG. 5. OSA test data files are partitioned into file header information, signal trace information, and channel trace information. File header information identifies the test data in the file as described above. Signal trace information provides optical power data over the full optical spectrum of the signal. Specifically, signal trace information is expressed in terms of optical power at different wavelengths embodied in the signal. Channel trace information partitions out additional performance data for each channel embodied in the signal. For each channel embodied in the signal, channel trace information is expressed in terms of a sequential channel number, a measured wavelength for the channel, a variance of the measured wavelength in relation to the provisioned wavelength for the channel, and a signal-to-noise ratio value for the channel. The network diagnostic device 14 is operable to parse the OSA test data file and display the test results using an intuitive graphical user interface as shown in FIG. 6.

Integrated OSA testing isolates faults at the level of individual optical transport sections. OSA testing also isolates performance degradation at the granularity of individual wavelengths, sub-bands, or fibers. OSA testing further facilitates fault isolation of degraded input and output power, noise figure, and gain tilt for both Erbium Doped Fiber Amplifier (EDFAs) and Raman amplifiers. The integration of OSA testing also provides preventive maintenance by monitoring slow amplifier performance degradation and enabling card replacement before real bit errors occur.

Before carrying live traffic over the optical transport network, carriers must conduct a bit error rate (BER) test of the end-to-end optical circuit. Traditional DWDM systems require field technicians to carry an external BER test set (BERTS) or a synchronous optical network (SONET) analyzer to the site for complete BER measurements. DWDM systems, in particular, require simultaneous multiple channel BER performance testing. Traditional BER testing, with external BER test equipment, has many associated logistical problems. Aside from the limited ability to conduct concurrent system tests, concurrent BER testing is cost-prohibitive, due to the high cost of the external BER test equipment and the need to ship the test equipment to each site.

Figure 8:
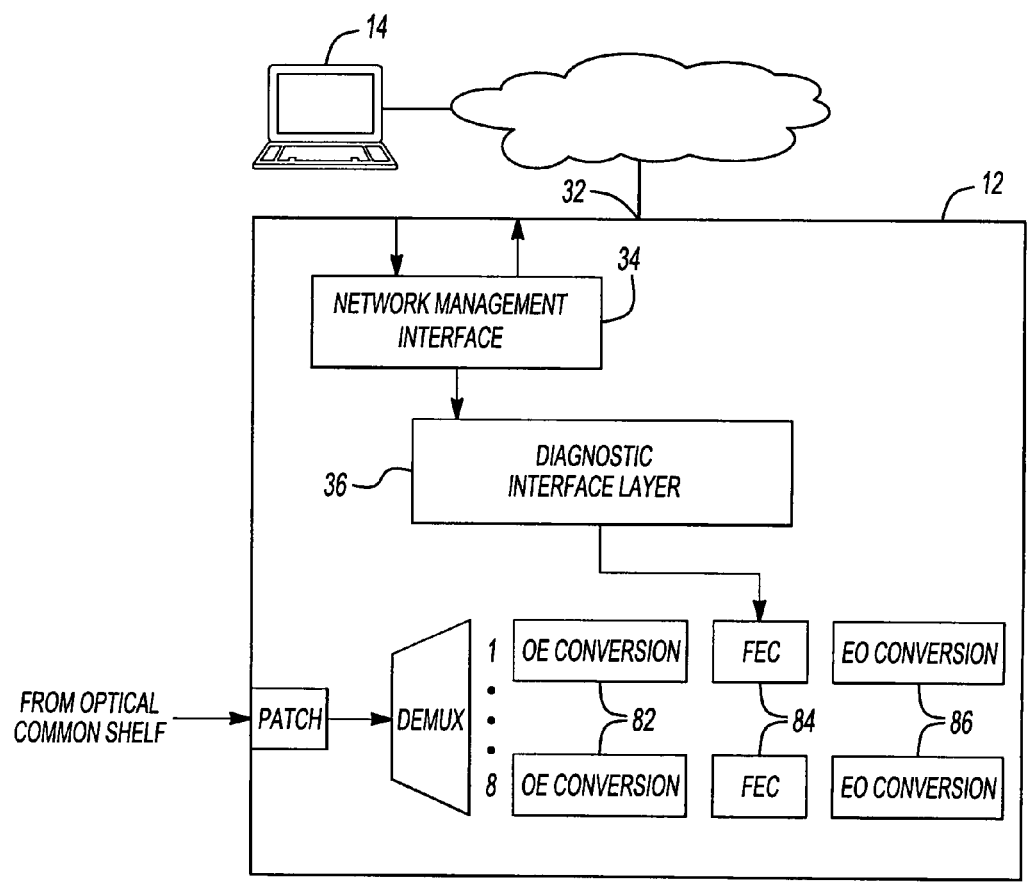
FIG. 8 is a block diagram illustrating how bit error rate testing is integrated into a network element in accordance with the present invention.

The integrated network diagnostic system 10 integrates BER testing into a network element as shown FIG. 8. BER testing is preferably integrated into an optical channel interface shelf of a network element. Optical channel interface shelves often serve as ingress/egress points to the optical transport network, such that electrical data signals are converted to optical data signals or vice versa. Thus, the optical channel interface shelf includes one or more optical-to-electrical conversion modules 82, electrical-to-optical conversion modules 84, and/or forward error correction (FEC) processors 86 as is well known in the art. It is envisioned that other optical components (e.g., demultiplexers) may also be incorporated into the optical channel interface shelf.

To initiate a BER test, a request is made by a network diagnostic device 14, where the request specifies a time interval for monitoring signal performance. As described above, the request is received the network management interface 34 residing on the shelf. The network management interface 34 in turn issues the request to a diagnostic interface layer 36. In this instance, the diagnostic interface layer 36 interacts with one or more of the FEC processors 86 residing on the shelf. In particular, the diagnostic interface layer 36 requests corrected error data (i.e., 1s/0s) from the FEC processor 86 and uses the requested error data to calculate the bit error rate.

To support continuous monitoring, the diagnostic interface layer 36 responds in real-time to the request from the network diagnostic device 14. Bit error rate data is transferred by the network management interface 34 using TL1, SMNP, or another well known network protocol to the network diagnostic device 14. The network diagnostic device 14 then displays the BER test results using an interactive graphical user interface.

BER testing not only measures end-to-end per-channel bit error rate information, but it also gives continuous monitoring of the instantaneous system margin, measured in dBQ, to isolate any faults to an individual section of the optical network. This monitoring of the system margin allows the carrier to be confident that, even with zero bit errors, the system is operating in a stable manner with a high margin. Without the dBQ margin measurement, carriers cannot quantify a channel's digital performance without actual errors occurring on the line.

BER testing also measures the distribution of error inter-arrival times. This error measurement allows the carrier to investigate burstiness of errors and to take advantage of advanced fault isolation capabilities. Digital performance monitoring of circuits is essential in guaranteeing BER performance and tracking service level agreements.

Figure 9:
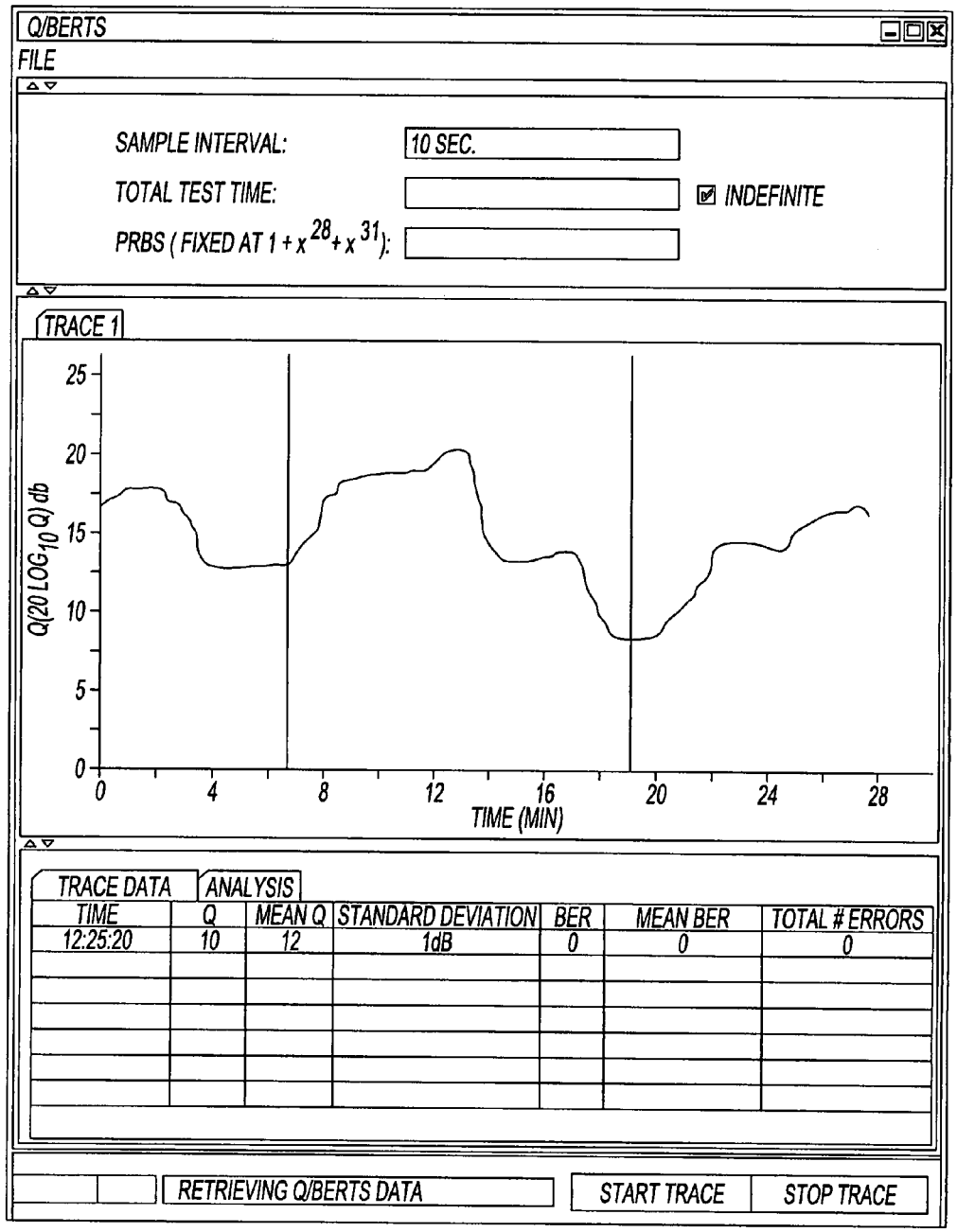
FIG. 9 is an exemplary graphical user interface employed by the network diagnostic device to display bit error rate and Q test data in accordance with the present invention.

It is readily understood that Q may also be calculated from the corrected error rate provided by the FEC processor 86. Continuous Q monitoring identifies time variant impairments such as Cross Phase Modulation (XPM), Four Wave Mixing (FWM), Polarization Mode Dispersion (PMD), and Polarization Dependent Loss (PDL). Q monitoring also allows carriers to monitor the performance of a given signal channel before errors occur at the client interface (client-side errors only occur when line errors exceed the correction ability of the FEC algorithm). Carriers can benefit from the preventive maintenance value of the Q measurement data to ensure that any problems are fixed before there is any degradation of the client signal. Therefore, it is envisioned that Q and bit error rate data may be provided concurrently to the network diagnostic device 14. An exemplary user interface for displaying Q and bit error rate data is illustrated in FIG. 9.

When in service, the optical-electrical (O-E) receivers may operate with adaptive receiver thresholds. These thresholds tune the data recovery sampling phase and decision threshold to maximize performance and minimize BER. The adaptive receiver optimizes performance for all fiber types, chromatic dispersion, instantaneous PMD, transmitter/receiver process variations, and non-linear propagation distortions. For advanced debugging of the channel performance, the network diagnostic system 10 of the present invention has integrated Q contour mapping capabilities.

Q contour mapping sets an adaptive receiver into a scan mode such that it maps the Q value as a function of the decision threshold and the sampling phase. Since changing the sampling phase and/or the decision threshold will affect receiver performance, Q-contour mapping of the eye-diagram is performed out-of-service. Algorithms that can determine a contour map given a set of altitudes over a grid of X and Y coordinates are well known in the art. The Q-contour mapping capability will make use of such an algorithm by determining the Q estimates (altitudes) at a grid of locations across the sampling phase and decision threshold plane. The sampling phase is preferably plotted on the horizontal (X) axis; whereas decision threshold is plotted on the vertical (Y) axis.

In a preferred embodiment, an adaptive period of measurement is employed to perform Q contour mapping. The time spent to estimate the Q value at any given coordinates is optimized to the level of Q measured. To obtain a Q estimate with a given confidence interval (or error-bar), higher levels of Q require longer measurements (more time, to receive more bits for analysis) than lower levels of Q. The algorithm will therefore make use of this knowledge by pre-estimating the Q level over a short initial time-period, and extending the length of the measurements as required. As compared to an algorithm where an equal amount of time is spent at each coordinate of the grid, the adaptive period of measurement technique will reduce the time required to cover the entire grid, yet provide equal confidence levels for each Q estimate in the grid.

Furthermore, a useful Q-contour mapping of a typical eye diagram is not made of equally spaced contour plots. Typically, contours of Q levels of interest (over an eye surface) can lie very close to each other. Therefore, a grid made of equally spaced X and Y coordinates is not the optimal grid to be sampling at, since a lot of resolution may be missing were required. For this reason, a more appropriately weighted grid will be overlaid onto the eye surface. This will be done by first determining the outer Q boundaries over the X and Y coordinates of the current eye, then scaling a pre-determined grid within these boundaries. Once the grid has been set, the Q estimates can be measured at each point in the grid.

Figure 10:
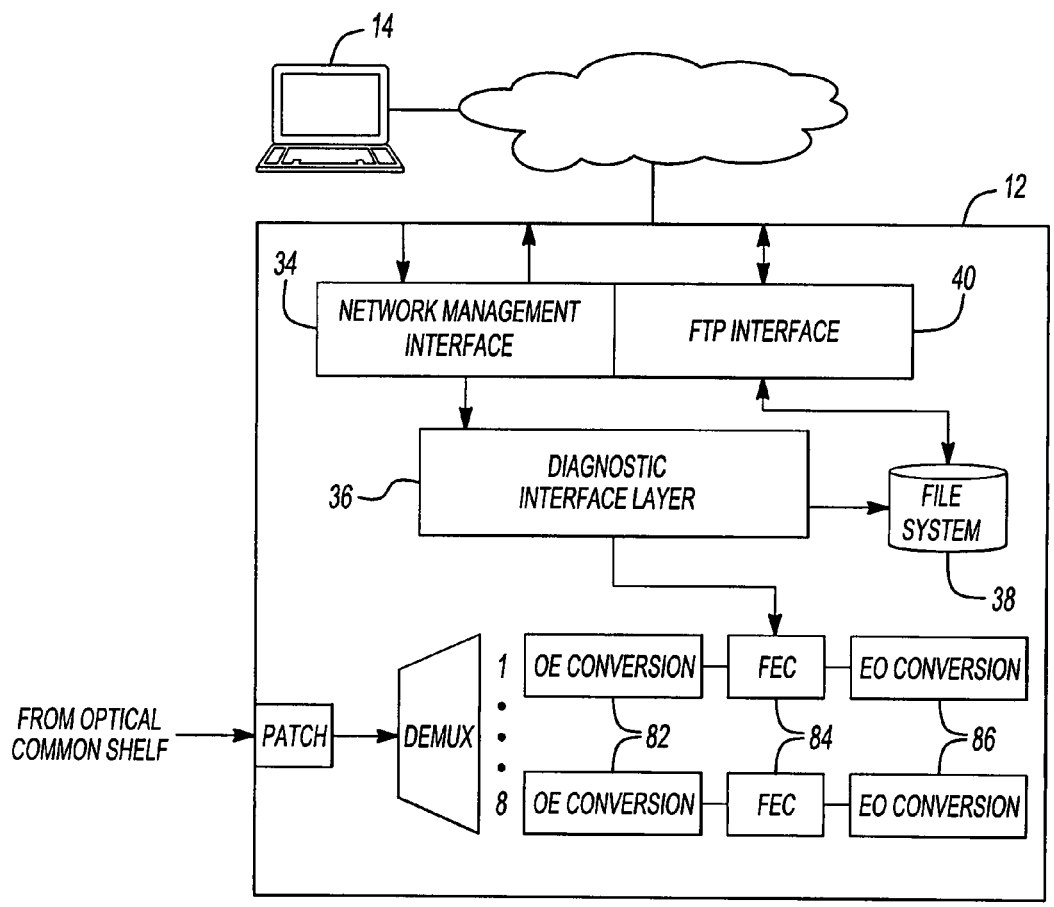
FIG. 10 is a block diagram illustrating how Q contour mapping is integrated into a network element in accordance with the present invention.

Q contour mapping capabilities are preferably integrated into an optical channel interface shelf of a network element as shown in FIG. 10. A request for a Q contour map may be initiated by a network diagnostic device. The request is received by the network management interface 34 and issued in turn to the diagnostic interface layer 36. To generate the map, the diagnostic interface layer 36 interacts with an adaptive receiver embodied in an optical-to-electrical conversion module 82 and the corresponding FEC processor 86. Specifically, the sampling phase and the decision threshold of the receiver is varied by the diagnostic interface layer 36. At each variance, the diagnostic interface layer 36 collects corrected error data from the FEC processor 86 and converts it into Q values. The diagnostic interface layer 36 then stores the Q contour mapping data in a data storage device residing on the shelf.

Figure 11:
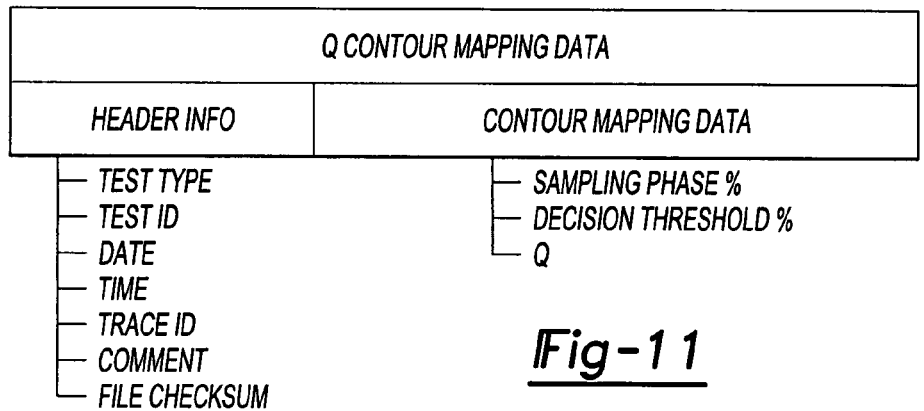
FIG. 11 is an exemplary data structure for Q contour mapping data in accordance with the present invention.

Q contour mapping data is preferably stored in accordance with the data structure shown in FIG. 11. Test data files are partitioned into file header information and Q contour mapping data. File header information identifies the test data in the file as described above. Q contour mapping data is further defined as sampling phase percentage, decision threshold percentage, and Q values, where sampling phase percentage is expressed as the percentage of the range over which sampling phase may be varied and decision threshold percentage is expressed as the percentage of the range over which decision threshold may be varied.

Figure 12:
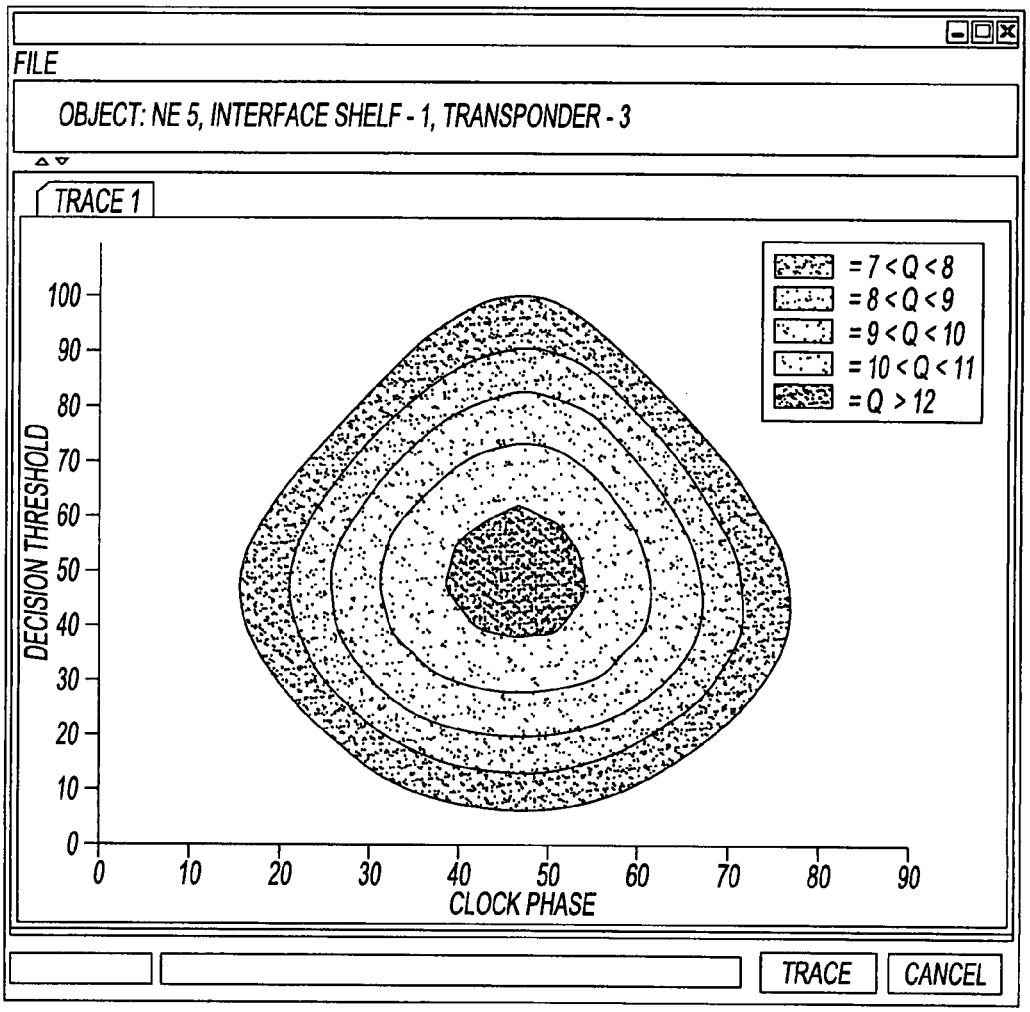
FIG. 12 is an exemplary graphical user interface employed by the network diagnostic device to display Q contour mapping data in accordance with the present invention.

Q contour mapping data is transferred to the requesting network diagnostic device 14 in the same manner as OTDR and OSA test data files. In other words, Q contour test data files are transferred using a file transfer scheme as described above. The network diagnostic device 14 is then operable to parse the test data file and display the test results using an intuitive graphical user interface as shown in FIG. 12.

Carriers can evaluate the signal at the receiver data recovery circuit by looking at the Q contour map. Carriers can map the Q contour of a receiver at installation, or, if the system is already active, they can take the channel out of service. The Q contour map provides the distortion, noise, and timing jitter performance for the received optical waveform, and indicates how susceptible the channel is to these degradations. Carriers can also perform Q contour mapping on a per channel basis without affecting the performance of other active channels.

Carriers can further use Q contour maps to isolate faults. Trained technicians can use Q contour maps for advanced debugging functions. For example, the Q contour map can help identify timing jitter problems such as synchronization or framing errors, distortion penalties from optical filters, dispersion compensation mismatch, fiber non-linearity, and any optical or thermal noise effects. None of the traditional DWDM vendors support this kind of integrated measurement functionality.

This extensive suite of diagnostic tools available in the network diagnostic system of the present invention will greatly increase carrier service velocity for optical capacity and reduce the mean time to repair under failure scenarios. The primary application for such diagnostic capabilities is in facilitating rapid and remote fault isolation. This will ensure rapid service velocity for new optical bandwidth connections and timely isolation and repair of faults in the field.

While the invention has been described in its presently preferred form, it will be understood that the invention is capable of modification without departing from the spirit of the invention as set forth in the appended claims.

What is claimed is:

1. A network diagnostic system for an optical transport network having a plurality of network elements, comprising;
   a first network element residing in the optical transport network, the first network element having a network diagnostic operation integrated therein and operable to perform the network diagnostic operation, wherein the network diagnostic operation directly monitors an optical signal traversing the optical transport network; and
   a network diagnostic device in data communication with a second network element residing in the optical transport network and operable to initiate the network diagnostic operation at the first network element;
   the second network element adapted to receive a request to initiate the network diagnostic operation from the network diagnostic device, the second element operable to map the request into at least one optical network frame and transmit the optical network frame over an optical supervisory channel of the optical transport network to the first network element.

2. The network diagnostic system of the claim 1 wherein the first network element is further operable to communicate the network performance data determined by the network diagnostic operation to the network diagnostic device.

3. The network diagnostic system of claim 2 wherein the network diagnostic device is operable to display the network performance data received from the first network element.

4. The network diagnostic system of clam 1 wherein the network diagnostic device is directly connected to the second network element.

5. The network diagnostic system of claim 1 wherein the network diagnostic device is connected via a computer network to the second network element.

6. The network diagnostic system of claim 5 wherein the second network element is further operable to communicate in real-time the network performance data determined by the network diagnostic operation to the network diagnostic device using TL1 network management protocol.

7. The network diagnostic system of claim 5 wherein the first network element is further operable to store the network performance data in a storage medium residing on the second network element and the network diagnostic device operable to retrieve the network performance data from the second network element using a file transfer protocol.

8. The network diagnostic system of claim 1 wherein the second network element is adapted to receive Ethernet frames from the network diagnostic device, where the Ethernet frames embody the request to initiate the network diagnostic operation; the second network element being further operable to map the Ethernet frames into at least one optical network frame and transmit the optical network frames over an optical supervisory channel of the optical transport network.

9. The network diagnostic system of claim 8 wherein the first network element is adapted to receive the optical network frames over the optical supervisory channel from the second network element and to extract the Ethernet frames from the optical network frames.

10. The network diagnostic system of claim 1 wherein the network diagnostic function is selected from the group comprising an optical time domain reflectometer test, an optical spectrum analyzer test, a bit error rate test, and a Q contour mapping test.

11. The network diagnostic system of claim 1 wherein the network diagnostic operation is further defined as an optical time domain reflectometer test, such that the network performance data is optical attenuation data for an optical trace signal traversing one or more optical spans in the optical transport network and fiber characteristic data for the optical spans.

12. The network diagnostic system of claim 11 wherein the optical attenuation data is expressed in terms of reflected optical power data, and corresponding measurement point data.

13. The network diagnostic system of claim 12 wherein the optical attenuation data further includes trace event data for a plurality of trace events, where each trace event data is expressed in terms of an event identifier, an event type, an event distance, reflectance associated with the event, insertion loss associated with the event, cumulative loss for the event, attenuation between the event and a subsequent event, and an event description.

14. The network diagnostic system of claim 1 wherein the network diagnostic operation is further defined as an optical spectrum analyzer test, such that the network performance data is signal power data for an optical data signal traversing through the optical transport network.

15. The network diagnostic system of claim 14 wherein the signal power data is expressed in terms of optical power data and corresponding measured wavelength data.

16. The network diagnostic system of claim 15 wherein the signal power data further includes channel trace data, where the channel trace data is further defined as a channel identifier, a measured channel wavelength, a variance of the measured wavelength in relation to the provisioned wavelength for the channel and a signal-to-noise ratio value for the channel.

17. The network diagnostic system of claim 1 wherein the network diagnostic operation is further defined as a bit rate error test, such that the network performance data is bit rate error data for an optical data signal traversing through the optical transport network.

18. The network diagnostic system of claim 1 wherein the network diagnostic operation is further defined as a Q contour mapping test, such that the network performance data is Q contour mapping data.

19. The network diagnostic system of claim 18 wherein the Q contour mapping data is expressed in terms of a sampling phase percentage, a decision threshold percentage and a Q value.

20. The method of claim 1 herein the step of communicating the operation to the first network element further comprises mapping Ethernet frames into a payload portion of one or more optical network frames and transmitting the optical network frames over an optical supervisory channel in the optical transport network.

21. A method for diagnosing an optical transport network having a plurality of network elements, comprising:
   integrating a diagnostic operation into a first network element in the optical transport network;
   transmitting a request for the diagnostic operation from a network diagnostic device remotely located from the first network element to a second network element in the optical transport network;
   communicating the request from the second network element via an optical supervisory channel to the first network element;
   performing the diagnostic operation on the first network element, wherein the network diagnostic operation directly monitors an optical signal traversing the optical transport network; and
   communicating the network performance data to the network diagnostic device.

22. The method of claim 21 wherein the diagnostic operation is selected from the group comprising an optical time domain reflectometer test, an optical spectrum analyzer test, a bit error rate test, and a Q contour mapping test.

23. The method of claim 21 wherein the step of performing the diagnostic operation further comprises carrying out an optical time domain reflector test, such that the such that the network performance data is optical attenuation data for an optical trace signal traversing one or more optical spans in the optical transport network and fiber characteristic data for the optical spans.

24. The method of claim 23 wherein the optical attenuation data is expressed in terms of reflected optical power data, and corresponding measurement point data.

25. The method of claim 24 wherein the optical attenuation data further includes trace event data for a plurality of trace events, where each trace event data is expressed in terms of an event identifier, an event type, an event distance, reflectance associated with the event, insertion loss associated with the event, cumulative loss for the event, attenuation between the event and a subsequent event, and an event description.

26. The method of claim 21 wherein the step of performing the diagnostic operation further comprises carrying out an optical spectrum analyzer test, such that the network performance data is signal power data for an optical data signal traversing through the optical transport network.

27. The method of claim 26 wherein the signal power data is expressed in terms of optical power data and corresponding measured wavelength data.

28. The method of claim 27 wherein the signal power data further includes channel trace data, where the channel trace data is further defined as a channel identifier, a measured channel wavelength, a variance of the measured wavelength in relation to the provisioned wavelength for the channel and a signal-to-noise ratio value for the channel.

29. The method of claim 21 wherein the step of performing the diagnostic operation further comprises carrying out a bit rate error test, such that the network performance data is bit rate error data for an optical data signal traversing through the optical transport network.

30. The method of claim 21 wherein the step of performing the diagnostic operation further comprises carrying out a Q contour mapping test, such that the network performance data is Q contour mapping data.

31. The method of claim 30 wherein the Q contour mapping data is expressed in terms of a sampling phase percentage, a decision threshold percentage and a Q value.

* * * * *